(12) United States Patent
Kohno et al.

(10) Patent No.: US 10,160,175 B2
(45) Date of Patent: Dec. 25, 2018

(54) PRESS MACHINE AND METHOD FOR CONTROLLING SLIDE OF PRESS MACHINE

(71) Applicant: AIDA ENGINEERING, LTD., Sagamihara-shi, Kanagawa (JP)

(72) Inventors: Yasuyuki Kohno, Sagamihara (JP); Ryosho Iwamura, Sagamihara (JP); Tadahiro Kondo, Sagamihara (JP)

(73) Assignee: Aida Engineering, Ltd., Kanagawa (JP)

( * ) Notice: Subject to any disclaimer, the term of this patent is extended or adjusted under 35 U.S.C. 154(b) by 1313 days.

(21) Appl. No.: 14/166,441

(22) Filed: Jan. 28, 2014

(65) Prior Publication Data

US 2014/0208964 A1    Jul. 31, 2014

(30) Foreign Application Priority Data

Jan. 29, 2013 (JP) .................. 2013-014379
Apr. 15, 2013 (JP) .................. 2013-084743

(51) Int. Cl.
*B30B 15/16* (2006.01)
*B23Q 5/033* (2006.01)
(Continued)

(52) U.S. Cl.
CPC ............ *B30B 15/165* (2013.01); *B23Q 5/033* (2013.01); *B30B 1/265* (2013.01); *B30B 1/34* (2013.01); *B30B 15/148* (2013.01); *B30B 15/16* (2013.01)

(58) Field of Classification Search
CPC .......... B23Q 5/033; B30B 1/265; B30B 1/34; B30B 15/165; B30B 15/161; B30B 15/148; B30B 15/20
See application file for complete search history.

(56) References Cited

U.S. PATENT DOCUMENTS 6,305,925 B1 * 10/2001 Cassani .................. B28B 3/003
                                                                425/405.1
7,926,317 B2 * 4/2011 Soga ....................... B30B 1/266
                                                                100/282
(Continued)

FOREIGN PATENT DOCUMENTS

DE    202007007144 U1 *  9/2007 ............. B30B 1/265
JP    60-159000 A        8/1985
(Continued)

OTHER PUBLICATIONS

Notification of Reasons for Rejection JP Patent Application No. 2013-014379 dated Dec. 5, 2014 with Partial English Translation.
(Continued)

*Primary Examiner* — Shelley Self
*Assistant Examiner* — Gregory Swiatocha
(74) *Attorney, Agent, or Firm* — McDermott Will & Emery LLP

(57) ABSTRACT

There is provided a press machine which can apply a large compression force to a mold as well as impart smooth vibration only in a rectilinear advancing direction to the mold, and thereby can improve the press-formability. A main slide and a sub-slide constitute a slide and at the same time a cylinder-piston mechanism. During press-forming, a compression force is transmitted to the sub-slide (an upper mold) through hydraulic pressure applied interlockingly with driving of the main slide, and the sub-slide is vibrated with the hydraulic pressure being periodically changed. Favorable press-forming can be performed even under relatively difficult press-forming conditions, by controlling the vibration such that a vibration frequency of the sub-slide (the upper mold) becomes 9 Hz or higher but 33.3 Hz or lower and a vibration amplitude of the sub-slide becomes 0.05 mm or larger but 0.5 mm or smaller.

17 Claims, 11 Drawing Sheets

(51) Int. Cl.
*B30B 1/26* (2006.01)
*B30B 1/34* (2006.01)
*B30B 15/14* (2006.01)
*B30B 15/20* (2006.01)

(56) References Cited

U.S. PATENT DOCUMENTS 8,049,457 B2 * 11/2011 Okita ................. B30B 1/14 100/214
2012/0090482 A1 * 4/2012 Kohno ............... B30B 15/284 100/48

FOREIGN PATENT DOCUMENTS

| | | | |
|---|---|---|---|
| JP | 01-122624 A | 5/1989 | |
| JP | 1-293995 A | 11/1989 | |
| JP | 01293995 A * | 11/1989 | |
| JP | 7-132330 A | 5/1995 | |
| JP | 09-285896 A | 11/1997 | |
| JP | 11-077389 A | 3/1999 | |
| JP | 11-151631 A | 6/1999 | |
| JP | 11-226798 A | 8/1999 | |
| JP | 11226798 A * | 8/1999 | ......... B30B 15/0076 |
| JP | 2002-219600 A | 8/2002 | |
| JP | 2004-261826 A | 9/2004 | |
| JP | 2008-260042 A | 10/2008 | |
| JP | 2008260042 A * | 10/2008 | |
| JP | 2011-016138 A | 1/2011 | |
| JP | 2011-245515 A | 12/2011 | |
| JP | 2012-086246 A | 5/2012 | |
| WO | WO 2013028736 A1 * | 2/2013 | ........... B29C 67/244 |

OTHER PUBLICATIONS

Notification of Reasons for Rejection Japanese Patent Application No. 2013-084743 dated Mar. 23, 2015 with partial English translation.

* cited by examiner

DIE CUSHION FORCE          DIE CUSHION FORCE

PRESS MACHINE AND METHOD FOR CONTROLLING SLIDE OF PRESS MACHINE

BACKGROUND OF THE INVENTION

Field of the Invention

The present invention relates to a press machine and a method for controlling a slide of a press machine, and in particular, to a technology of forming a material while imparting microvibration to a mold.

Description of the Related Art

Conventionally, there has been proposed a vibration press-forming method in which a vibrator is connected to an upper mold of a press machine and a material is pressed between the upper mold and a lower mold by lowering the upper mold while ultrasonically vibrating it with the vibrator (Japanese Patent Application Laid-Open No. 01-122624).

Further, there have been proposed a vibration machining device which transmits vibration to a press head through a lever mechanism, and a press-forming device in which a vibration mechanism having a cam part is fitted at an intermediate rotational fulcrum of a link mechanism for driving a slide (Japanese Patent Applications Laid-Open No. 09-285896 and No. 2008-260042).

Moreover, there have been proposed press machines which apply vibration to a slide with a servomotor indirectly driving a crankshaft through a gear, etc. (Japanese Patent Applications Laid-Open No. 2011-16138 and No. 2011-245515), a press which directly applies vibration to a slide with a linear servomotor (Japanese Patent Application Laid-Open No. 11-77389), and a press machine which uses a servomotor to drive a slide through a screw-nut mechanism without involving a decelerator, wherein high-frequency vibration is applied to induce micromotion of the screw-nut mechanism (Japanese Patent Application Laid-Open No. 11-151631).

SUMMARY OF THE INVENTION

In the context of the time when the modern technologies for freely moving a slide of a press machine were not yet established on the press machine manufacturers' side, the invention described in Japanese Patent Application Laid-Open No. 01-122624 performs press-forming while applying microvibration to the mold. Presumably, it was out of necessity that the mold structure of the embodiment where the ultrasonic vibrator is connected to the mold (upper mold) was adopted. In this case, each mold needs to be provided with the vibration mechanism, which poses a problem of an extremely higher price.

In the inventions described in Japanese Patent Applications Laid-Open No. 09-285896 and No. 2008-260042, since vibration is not applied in the vertical direction to a slide, which governs forming by moving up and down in the vertical direction, vibration components other than in the vertical direction accompanying the vibration are applied to the slide. As a result, the slide moves in directions other than the vertical direction due to a gib clearance or a shaft clearance (the slide is accompanied by microvibration for the amount of the clearances). This effect is advantageous in that friction between the mold and the material is reduced, but is more predominantly disadvantageous in that resistance which hinders forming is imparted between the mold and the material, so that no effect for improving the formability can be obtained.

In the inventions described in Japanese Patent Applications Laid-Open No. 2011-16138 and No. 2011-245515, the frequency is difficult to increase or the vibration waveform becomes irregular, due to influences of a larger inertial mass of the slide to be vibrated, etc., backlash of the gear, and clearances inside the mechanism in the upper-lower direction and the left-right direction. Thus, the inventions are considered to be unsuitable for improving the formability, and their utilization purpose is limited to mere prevention of sticking of the slide. Further, due to a concern that the mechanism itself can be damaged, it is difficult to practice the inventions in forming applications (for the purpose of friction reduction).

In the invention described in Japanese Patent Application Laid-Open No. 11-77389, since vibration is directly applied to the slide with the linear servomotor, the magnitude of the output is limited and, for example, the magnitudes of force and energy are limited to about less than 100 kN and less than 20 kW, respectively. As a result, objects to be formed are also limited, and it is not practical in the first place to apply the invention to press machines.

In the invention described in Japanese Patent Application Laid-Open No. 11-151631, since vibration is imparted in the rotational direction through the screw-nut mechanism, the slide vibrates also in the rotational (torsional) direction other than the vertical direction, and due to the influence of a gib clearance, discontinuous vibration in the rotational direction occurs, which is likely to hinder the forming.

The present invention has been made in view of these circumstances, and an object thereof is to provide a press machine capable of applying a large compression force to a mold as well as imparting smooth vibration, which is vibration only in a rectilinear advancing direction of compression, to the mold, and thereby improving the formability, and a method for controlling a slide of a press machine.

In order to achieve the above object, a press machine according to one aspect of the present invention includes: a main slide which is disposed so as to be reciprocable in a rectilinear advancing direction; a main slide drive device which drives the main slide to reciprocate; a sub-slide on which a mold is mounted, the sub-slide being disposed so as to be reciprocable in the same direction as the main slide and a compression force applied to the main slide being transmitted to the sub-slide through hydraulic pressure; a sub-slide drive device which drives the sub-slide to reciprocate relative to the main slide, the sub-slide drive device driving the sub-slide to reciprocate in the same direction as the main slide by changing pressure of the hydraulic pressure; a vibration control device which controls the sub-slide drive device such that the sub-slide vibrates, wherein a material is formed through cooperation between the main slide drive device and the sub-slide drive device.

According to the one aspect of the present invention, the slide is constituted of the main slide, and the sub-slide on which the mold is mounted, and the slide (the main slide and the sub-slide) is caused to reciprocate in the rectilinear advancing direction by the main slide drive device, and the sub-slide is caused to reciprocate (vibrate) relative to the main slide by the sub-slide drive device. Thus, it is possible to reduce the inertia mass of the sub-slide to be vibrated, etc. and improve the variable speed response of the mold to be vibrated. In addition, since the sub-slide is disposed so as to be reciprocable in the same direction as the rectilinear advancing direction in which the main slide reciprocates, it is possible to vibrate the mold only in the rectilinear advancing direction of compressing the material, and to improve the press-formability (prevention of fracture or crack of the material during forming) due to the effect of friction reduction between the mold and the material. Further, since the compression force applied from the main slide drive device to the main slide is transmitted to the sub-slide through the hydraulic pressure, it is possible to apply a large compression force to the sub-slide (mold), and since there is no intervention of a mechanical transmission element between the main slide and the sub-slide, there is no influence of a mechanical clearance, etc., which allows smooth vibration of the sub-slide.

In a press machine according to another aspect of the present invention, it is preferable that the vibration control device controls the sub-slide drive device such that a vibration frequency of the sub-slide becomes 9 Hz or higher but 33.3 Hz or lower and a vibration amplitude of the sub-slide becomes 0.05 mm or larger but 0.5 mm or smaller. The present inventors have discovered that the success and failure of press-forming depends on the vibration conditions (vibration frequency and vibration amplitude) of the mold, and have found the vibration conditions for successful press-forming from results of a vibration experiment. That is, when press-forming is performed, it is preferable that the mold (sub-slide) is vibrated such that the vibration frequency applied to the mold becomes 9 Hz or higher but 33.3 Hz or lower and the vibration amplitude applied to the mold becomes 0.05 mm or larger but 0.5 mm or smaller.

In a press machine according to yet another aspect of the present invention, it is preferable that the vibration control device controls the sub-slide drive device such that a vibration frequency of the sub-slide becomes 11.6 Hz or higher but 33.3 Hz or lower and a vibration amplitude of the sub-slide becomes 0.05 mm or larger but 0.5 mm or smaller, or controls the sub-slide drive device such that a vibration frequency of the sub-slide becomes 0.8 Hz or higher but lower than 11.6 Hz and a vibration amplitude of the sub-slide becomes 0.04 mm or larger but smaller than a value at which a direction of velocity of the sub-slide during forming is reversed.

The results of the vibration experiment found that when the mold (sub-slide) is vibrated such that the vibration frequency of the mold becomes 11.6 Hz or higher but 33.3 Hz or lower and the vibration amplitude of the mold becomes 0.05 mm or larger but 0.5 mm or smaller, the limit drawing ratio is increased due to an effect of friction reduction between the mold and the material. It was also found that when the mold (sub-slide) is vibrated such that the frequency becomes 0.8 Hz or higher but lower than 11.6 Hz and the vibration amplitude becomes 0.04 mm or larger but smaller than a value at which the direction of the velocity during forming is reversed, the limit drawing ratio is increased due to a stress relief effect on the material.

In a press machine according to yet another aspect of the present invention, the vibration control device controls the sub-slide drive device such that a direction of the velocity of the sub-slide is not reversed during forming of the material. Thus, since the sub-slide drive device is controlled such that the direction of the velocity of the sub-slide is not reversed during forming of the material, the limit drawing ratio can be increased due to the stress relief effect on the material.

In a method for controlling a slide of a press machine according to yet another aspect of the present invention, it is preferable that setting is made such that a vibration frequency of the sub-slide becomes 0.8 Hz or higher but lower than 11.6 Hz and a vibration amplitude of the sub-slide becomes 0.04 mm or larger but smaller than a value at which the direction of the velocity of the sub-slide during forming is reversed.

In a press machine according to yet another aspect of the present invention, the vibration control device includes: a relative position command device which outputs a relative position command signal indicating a position of the sub-slide relative to the main slide; and a relative position detection device which detects a position of the sub-slide relative to the main slide and outputs a relative position detection signal indicating the detected relative position, wherein it is preferable that the vibration control device controls the sub-slide drive device on the basis of the relative position command signal output from the relative position command device and the relative position detection signal output from the relative position detection device. In other words, when vibration is applied to the mold during forming, the position of the sub-slide relative to the main slide which is moving in the rectilinear advancing direction (the position in the rectilinear advancing direction corresponding to a vibration waveform) is controlled, and the position of the sub-slide (mold) is controlled on the basis of the position of the main slide and the position of the sub-slide relative to the main slide.

In a press machine according to yet another aspect of the present invention, the press machine further includes: a position command unit which outputs a position command signal indicating a position of the sub-slide with reference to the main slide; and a vibration command unit which outputs a vibration command signal indicating the vibration frequency and the vibration amplitude of the sub-slide, wherein the relative position command device adds the vibration command signal output from the vibration command unit to the position command signal output from the position command unit and outputs the relative position command signal.

The position command signal output from the position command unit is used as a signal for controlling the relative position of the sub-slide such that a slide motion of the sub-slide becomes a desired slide motion (a slide motion different from a slide motion of the main slide), and the relative position command signal obtained by adding the vibration command signal to the position command signal is used as a signal for vibrating the sub-slide in an appropriate period, etc. while controlling the relative position of the sub-slide such that the sub-slide makes a desired slide motion.

In a press machine according to yet another aspect of the present invention, the main slide and the sub-slide constitute a cylinder-piston mechanism, and the main slide is one of a cylinder and a piston of the cylinder-piston mechanism, while the sub-slide is the other of the cylinder and the piston of the cylinder-piston mechanism. Thus, the compression force applied to the main slide is transmitted through a hydraulic fluid inside the cylinder-piston mechanism to the sub-slide, and vibration, etc. can be imparted to the sub-slide by separately controlling the hydraulic pressure of the hydraulic fluid inside the cylinder-piston mechanism.

In a press machine according to yet another aspect of the present invention, the sub-slide drive device includes a servomotor and a hydraulic pump/motor which is driven by the servomotor and supplies a pressurized liquid to a hydraulic chamber of the cylinder-piston mechanism.

In a press machine according to yet another aspect of the present invention, the main slide drive device continuously moves the main slide, at least during a forming period, through a connecting rod of the press machine.

In a press machine according to yet another aspect of the present invention, it is preferable that the vibration control device controls the sub-slide drive device such that one of the vibration frequency and the vibration amplitude of the sub-slide is changed during forming of the material. Thus, the vibration conditions of the sub-slide can be varied according to a change in the velocity of the main slide, etc.

According to yet another aspect of the present invention, there is provided a method for controlling a slide of a press machine including a main slide which is disposed so as to be reciprocable in a rectilinear advancing direction, and a sub-slide on which a mold is mounted and which is disposed so as to be reciprocable in the same direction as the main slide, the method including steps of: driving the main slide in the rectilinear advancing direction and driving the sub-slide in the rectilinear advancing direction interlockingly with the driving of the main slide, so as to transmit a compression force, at least during forming of a material, to the sub-slide through a hydraulic pressure applied interlockingly with the driving of the main slide; and vibrating the sub-slide while periodically changing the pressure of the hydraulic pressure at least during forming of the material.

In a method for controlling a slide of a press machine according to yet another aspect of the present invention, the vibration of the sub-slide is set to such vibration amplitude and frequency that the friction on sliding surfaces of the material and the mold is reduced.

In a method for controlling a slide of a press machine according to yet another aspect of the present invention, the vibration of the sub-slide is set such that the vibration frequency of the sub-slide becomes 9 Hz or higher but 33.3 Hz or lower and the vibration amplitude of the sub-slide becomes 0.05 mm or larger but 0.5 mm or smaller.

In a method for controlling a slide of a press machine according to yet another aspect of the present invention, it is preferable that the vibration of the sub-slide is set such that the vibration frequency of the sub-slide becomes 11.6 Hz or higher but 33.3 Hz or lower and the vibration amplitude of the sub-slide becomes 0.05 mm or larger but 0.5 mm or smaller, or set such that the vibration frequency of the sub-slide becomes 0.8 Hz or higher but lower than 11.6 Hz and the vibration amplitude of the sub-slide becomes 0.04 mm or larger but smaller than a value at which the direction of the velocity of the sub-slide during forming is reversed.

In a method for controlling a slide of a press machine according to yet another aspect of the present invention, it is preferable that the vibration amplitude and the vibration frequency of the sub-slide are set such that the direction of the velocity of the sub-slide during forming of the material is not reversed.

In a method for controlling a slide of a press machine according to yet another aspect of the present invention, it is preferable that setting is made such that the vibration frequency of the sub-slide becomes 0.8 Hz or higher but lower than 11.6 Hz and the vibration amplitude of the sub-slide becomes 0.04 mm or larger but smaller than a value at which the direction of the velocity of the sub-slide during forming is reversed.

In a method for controlling a slide of a press machine according to yet another aspect of the present invention, it is preferable that, in the vibration of the sub-slide, one of the vibration frequency and the vibration amplitude is changed during forming of the material.

According to the present invention, the slide is constituted of the main slide which is disposed so as to be reciprocable in the rectilinear advancing direction and the sub-slide which is disposed so as to be reciprocable in the same direction as the main slide, and the compression force is transmitted to the sub-slide through the hydraulic pressure applied interlockingly with the driving of the main slide during forming, and the sub-slide is vibrated with the pressure of the hydraulic pressure being periodically changed. Thus, it is possible to apply a large compression force to the sub-slide (mold), and since there is no intervention of a mechanical transmission element between the main slide and the sub-slide, there is no influence of a mechanical clearance, etc., which allows smooth vibration of the sub-slide. Further, since the sub-slide is caused to reciprocate (vibrate) relative to the main slide, it is possible to reduce the inertia mass of the sub-slide to be vibrated, etc., to reduce the energy required for vibration, and to significantly improve the variable speed response of the mold.

By controlling the vibration of the mold such that the vibration frequency of the sub-slide (mold) becomes 9 Hz or higher but 33.3 Hz or lower and the vibration amplitude of the sub-slide becomes 0.05 mm or larger but 0.5 mm or smaller, the limit drawing ratio can be increased due to the effect of friction reduction between the mold and the material, and favorable press-forming can be performed even under relatively difficult press-forming conditions.

Further, by vibrating the sub-slide (mold) such that the direction of the velocity of the sub-slide during forming of the material is not reversed, the limit drawing ratio can be increased due to the stress relief effect on the material, and favorable press-forming can be performed even under relatively difficult press-forming conditions.

DETAILED DESCRIPTION OF THE PREFERRED EMBODIMENTS

Hereinafter, preferred embodiments of a press machine and a method for controlling a slide of a press machine according to the present invention will be described in detail in accordance with the attached drawings.

[Embodiment of Press Machine]

<Structure of Press Machine>

Figure 1:
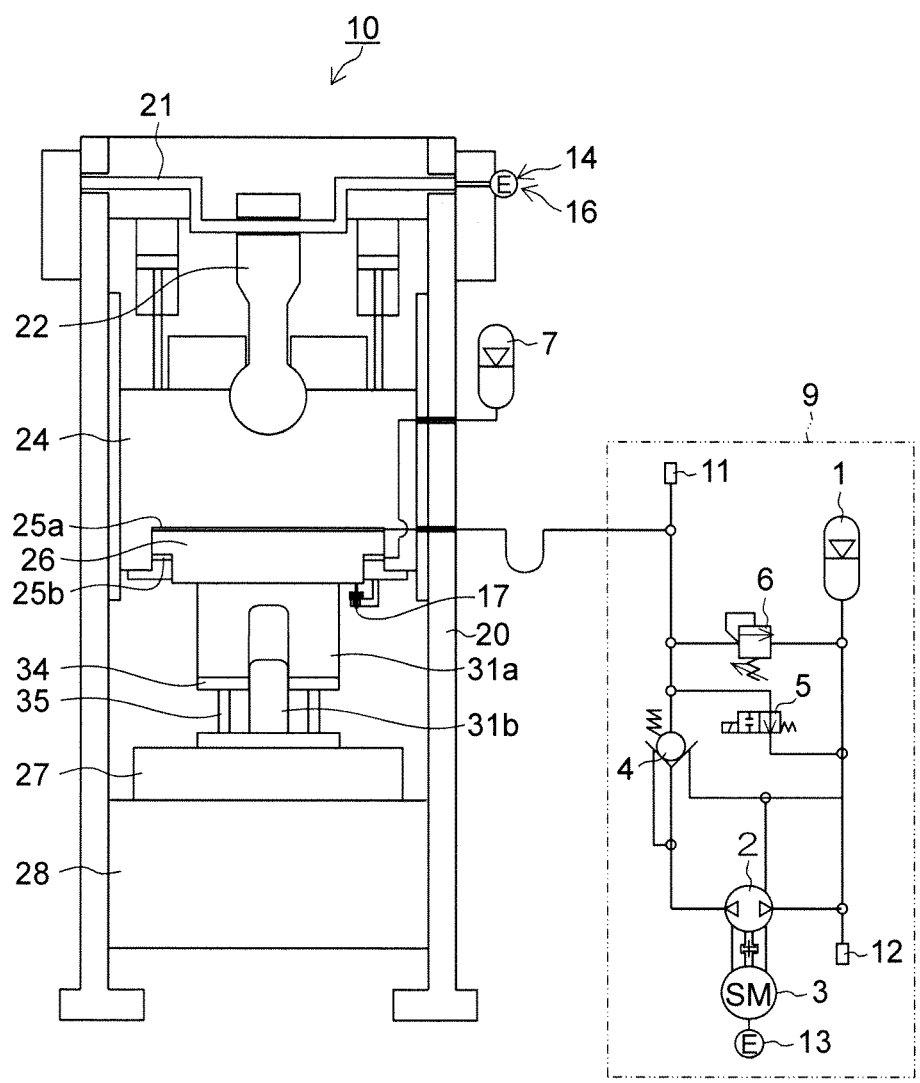
FIG. 1 is a constitution diagram showing an embodiment of a press machine to which the present invention is applied.

FIG. 1 is a constitution diagram showing an embodiment of a press machine to which the present invention is applied.

A press machine 10 shown in FIG. 1 is a crank press which includes a column (frame) 20, a crankshaft 21, a connecting rod 22, a main slide 24, a sub-slide 26, a bolster 27 on a bed 28, etc.

The main slide 24 is guided by a guide provided in the column 20 so as to be reciprocable in a rectilinear advancing direction (in the upper-lower direction in FIG. 1).

The main slide 24 and the sub-slide 26 constitute a cylinder-piston mechanism (hydraulic cylinder), and the main slide 24 corresponds to a cylinder of the hydraulic cylinder, while the sub-slide 26 corresponds to a piston of the hydraulic cylinder. The sub-slide 26 is disposed, relative to the main slide 24, so as to be reciprocable in the same direction as the rectilinear advancing direction in which the main slide 24 moves.

A leading end of the connecting rod 22 provided in the crankshaft 21 is coupled with the main slide 24. A rotational drive force is transmitted to the crankshaft 21 through a servomotor, a decelerating gear, etc. which are not shown, and when the crankshaft 21 rotates, the main slide 24 is moved together with the sub-slide 26 in the upper-lower direction in FIG. 1 by the drive force applied through the crankshaft 21 and the connecting rod 22.

Pressure oil can be supplied from a hydraulic circuit 9 to a lowering-side hydraulic chamber 25a of the hydraulic cylinder, and the pressure oil supplied from the hydraulic circuit 9 to the lowering-side hydraulic chamber 25a serves as a power source for lowering the sub-slide 26 relative to the main slide 24. A power source for raising the sub-slide 26 relative to the main slide 24 is provided by a force generated by supplying air pressure from an air tank 7 to a raising-side hydraulic chamber 25b, a reaction force of a press load received from the lower mold through the upper mold, or a raising force of a die cushion force.

The crankshaft 21 is provided with an angular velocity detector 14 and an angle detector 16 which detect an angular velocity and an angle of the crankshaft 21, respectively, and a relative position detector 17 which detects a position of the sub-slide 26 relative to the main slide 24 is provided between the main slide 24 and the sub-slide 26. The angular velocity detector 14 may be a type which obtains an angular velocity signal by differentiating an angle signal output from the angle detector 16.

An upper mold (die) 31a is mounted on the sub-slide 26 and a lower mold (punch) 31b is mounted on the bolster 27. The intended use of the mold 31 (upper mold 31a and lower mold 31b) in this example is forming of a product having a hollow cup shape (drawn shape) with a closed upper side.

A hold-down plate 34 is provided between the upper mold 31a and the lower mold 31b, and a lower side of the hold-down plate 34 is supported by a cushion pad through multiple cushion pins 35, and a material is set on (brought into contact with) an upper side of the hold-down plate. The die cushion force is applied to the hold-down plate 34 during forming of the material through the cushion pad and the cushion pins 35.

<Hydraulic Circuit>

The hydraulic circuit 9 used in the press machine 10 is constituted mainly of an accumulator 1, a hydraulic pump/motor 2, a servomotor 3 connected to a rotary shaft of the hydraulic pump/motor 2, a pilot operated check valve 4, a solenoid valve 5, and a relief valve 6.

The accumulator 1, with a gas pressure set to about 1 to 5 $kg/cm^2$, accumulates hydraulic oil at a low pressure (substantially constant low pressure) of 10 $kg/cm^2$ or lower and fulfills a function of a tank.

One of ports of the hydraulic pump/motor 2 is connected through the pilot operated check valve 4 to the lowering-side hydraulic chamber 25a of the hydraulic cylinder, and the other port is connected to the accumulator 1. The hydraulic pump/motor 2 rotates in a normal direction (to a side of compressing the lowering-side hydraulic chamber 25a) or in a reverse direction (to a side of decompressing the lowering-side hydraulic chamber 25a) according to a torque applied from the servomotor 3 and the hydraulic pressure acting on the both ports.

In a region of a non-forming process (at least an upper half of a slide stroke) within one cycle of an action of pressing (sliding), the pilot operated check valve 4, in order to reduce a load on the servomotor 3 (plus the hydraulic pump/motor 2), allows the pressure in the lowering-side hydraulic chamber 25a to be maintained constant even under a no-load condition (zero-torque condition) of the servomotor 3, and maintains the sub-slide 26 at a lowering end (limit) relative to the main slide 24. As one example, the pressure acting on the port on the lowering-side hydraulic chamber 25a side of the hydraulic pump/motor 2 is used for pilot operation.

The solenoid valve 5 fulfills a function of forcibly releasing the pressure acting on the lowering-side hydraulic chamber 25a. The solenoid valve is not used at normal times (when the machine is functioning), but used during maintenance (before disassembly of the machine), etc.

The relief valve 6 fulfills a function of releasing the hydraulic oil to a side of the substantially constant low pressure (accumulator 1) when unexpected abnormal pressure, other than the pressure normally generated with motion control, acts on the lowering-side hydraulic chamber 25a.

The pressure acting on the port on the lowering-side hydraulic chamber 25a side of the hydraulic pump/motor 2 and the pressure acting on the port on the accumulator 1 side of the hydraulic pump/motor 2 are respectively detected by pressure detectors 11 and 12, and the angular velocity of the servomotor 3 is detected by an angular velocity detector 13.

<Sub-Slide Controller of Press Machine>

Figure 2:
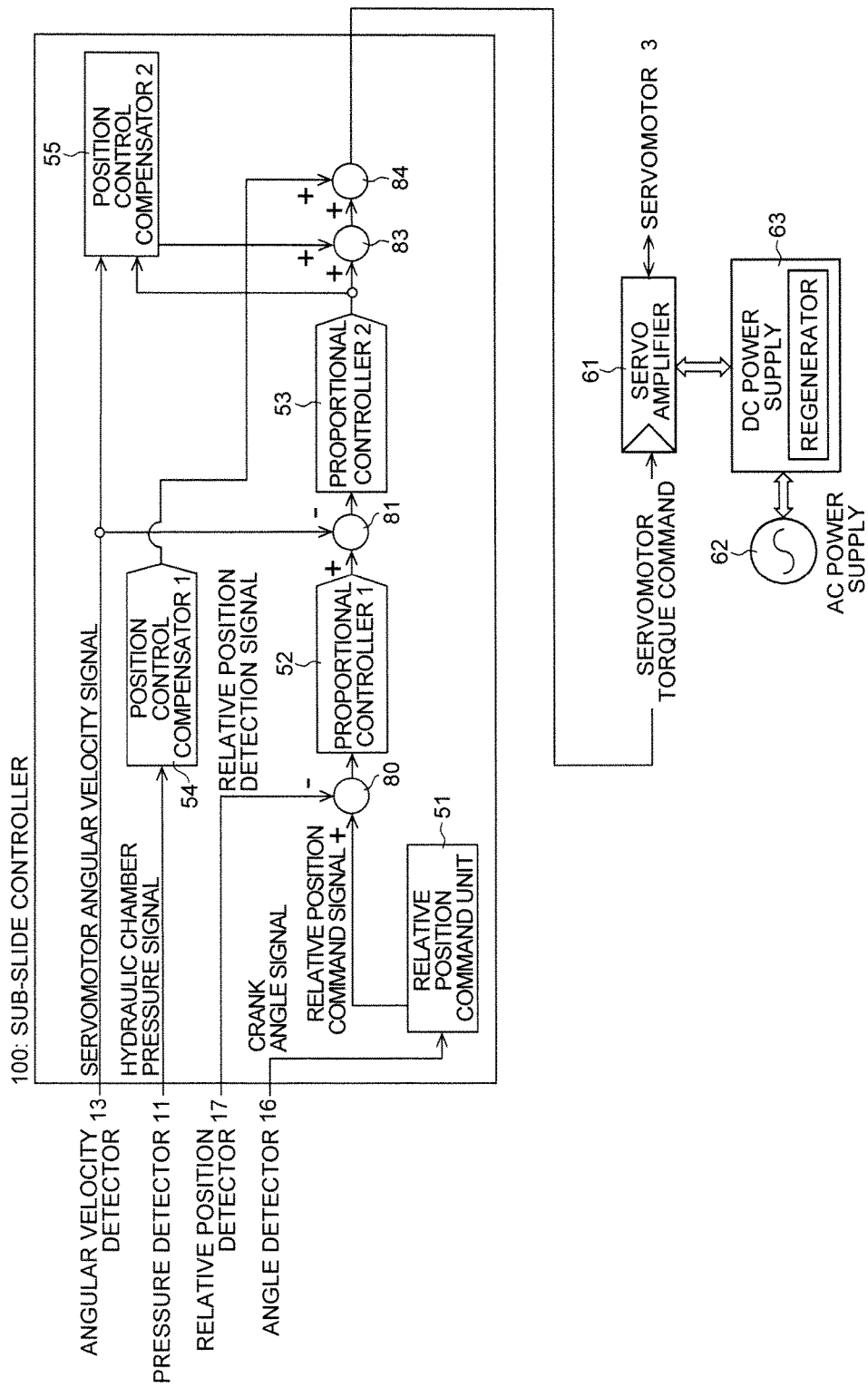
FIG. 2 is a block diagram showing an embodiment of a sub-slide controller which controls a sub-slide of the press machine shown in FIG. 1.

FIG. 2 is a block diagram showing an embodiment of a sub-slide controller which controls the sub-slide of the press machine 10 shown in FIG. 1.

As shown in FIG. 2, a sub-slide controller 100 is mainly constituted of a relative position command unit (relative position command device) 51, proportional controllers 52, 53, position control compensators 54, 55, a relative position detector (relative position detection device) 17, subtracters 80, 81, and adders 83, 84.

In order to make the relative position detection signal follow the relative position command signal of the sub-slide 26 relative to the main slide 24, the basic form of control by the sub-slide controller 100 is to drive the servomotor 3 on the basis of a second operation signal (a torque command signal of the servomotor 3) which is obtained by amplifying through the proportional controller 53 a deviation amount between an angular velocity signal of the servomotor 3 and a first operation amount signal, which is obtained by amplifying a deviation amount between the main slide and the sub-slide through the proportional controller 52. The proportional controller 52 governs the relative position control, while the proportional controller 53 governs an action of securing dynamic stability (returning a lagging phase).

The position control compensators 54 and 55 are not absolutely necessary for realizing the present invention, but are desirably provided in order to improve the controllability. The position control compensator 54 corrects an unbalanced force due to the gravity or a force of the hydraulic pressure acting on the lowering-side hydraulic chamber 25*a* of the hydraulic cylinder, while the position control compensator 55 relieves an influence of a force acting on the control system from the outside (e.g., forming force).

Next, the sub-slide controller 100 will be described in detail.

The relative position command unit 51 outputs a relative position command signal to the subtracter 80 for vibrating the sub-slide 26 for a predetermined period in a press cycle. The vibration conditions (vibration frequency and vibration amplitude) of the sub-slide 26 (upper mold 31*a*) can be controlled by a frequency and an amplitude of the relative position command signal output from the relative position command unit 51.

A relative position detection signal indicating a relative position of the sub-slide 26 relative to the main slide 24 is added from the relative position detector 17 to the other input of the subtracter 80, and the subtracter 80 obtains a deviation between the two inputs (a deviation signal obtained by subtracting the relative position detection signal from the relative position command signal), and outputs this deviation signal to the proportional controller 52. The proportional controller 52 amplifies the input deviation signal and outputs it as a first operation amount signal to the subtracter 81.

An angular velocity signal indicating an angular velocity of the servomotor 3 is added from the angular velocity detector 13 to the other input of the subtracter 81, and the subtracter 81 obtains a deviation between the first operation amount signal and the angular velocity signal and outputs this deviation signal to the proportional controller 53. The proportional controller 53 amplifies the input signal and outputs it as a second operation amount signal to the adder 83.

A feed forward signal, which is produced on the basis of the angular velocity signal of the servomotor 3 and the second operation amount signal, is added from the position control compensator 55 to the other input of the adder 83, and the adder 83 outputs a signal, which is obtained by adding up the two input signals, to the adder 84. A feed forward signal corresponding to the pressure of the lowering-side hydraulic chamber 25*a* detected by the pressure detector 11 is added from the position control compensator 54 to the other input of the adder 84, and the adder 84 outputs a signal, which is obtained by adding up the two input signals, to a servoamplifier 61 as a torque command signal of the servomotor 3.

In this way, the sub-slide controller 100 controls such that the relative position of the sub-slide 26 follows the relative position command, by calculating a torque command signal for controlling the torque of the servomotor 3, outputting this calculated torque command signal through the servo-amplifier 61 to the servomotor 3, and driving the hydraulic cylinder through the hydraulic pump/motor 2 driven by the servomotor 3.

In a case where the pressure in the lowering-side hydraulic chamber 25*a* of the hydraulic cylinder is to be reduced after press-forming, a rotary shaft torque generated in the hydraulic pump/motor 2 exceeds a drive torque of the servomotor 3, and the hydraulic pump/motor 2 acts as a hydraulic motor and rotates the servomotor 3 (regeneration action). The electric power generated by this regeneration action of the servomotor 3 is regenerated to an AC power supply 62 through the servoamplifier 61 and a DC power supply 63 with an electric power regeneration function.

[Vibration Experiment]

Figure 3A:
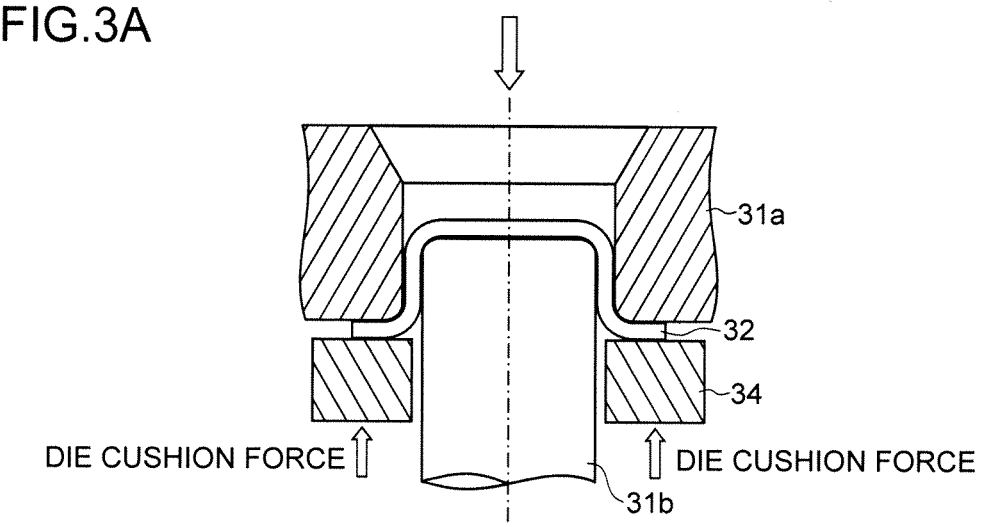
FIGS. 3A and 3B are views showing a material being formed (drawn) by an upper mold (die) and a lower mold (punch)
Figure 3B:
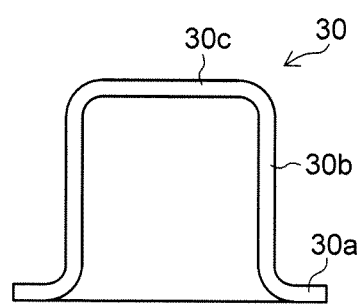

FIGS. 3A and 3B are views showing a material being formed (drawn) by the upper mold (die) 31*a* and the lower mold (punch) 31*b*. FIG. 3A shows a state during the drawing, and FIG. 3B shows a drawn product 30 having a hollow cup shape. In FIG. 3B, the reference numeral 30*a* designates a flange part, the reference numeral 30*b* designates a cylinder part, and the reference numeral 30*c* designates a bottom part.

As shown in FIG. 3A, the upper mold 31*a* is moved in the lowering direction, and a forming force is applied to a material 32 between the upper mold 31*a* and the lower mold 31*b* which is fixed on the bolster 27. As the drawing proceeds, a die cushion force is applied to the flange part of the material 32 through the hold-down plate 34, and thereby wrinkles generated by a compression force acting on the flange part in the circumferential direction is prevented.

A vibration experiment was conducted in which various vibrations are imparted to the upper mold 31*a* in a case where the drawing as described above is performed.

<Common Processing Conditions>

Press slide (main slide): 5 spm (number of strokes/minute)

Vibration imparting position (mm): 50 to 5.5 above the bottom dead point

Die cushion:

Die cushion stroke: from 78 mm above the bottom dead point

[Transformation Setting]

Slide position from the bottom dead point (mm): 78 to 35, 35 to 20, 20 to 5

Die cushion load (kN): 160, 160 to 50, 50 to 40

[Material]

Quality of material: SUS304

Thickness: 1 mm

Diameter: 300 mm

[Mold]

Drawing diameter: 150 mm

Drawing ratio: 50%

<Waveform/Overview of Experiment>

The following shows the results of the drawing experiment conducted under each of the operation conditions (1) and (2).

[Operation Condition (1)]

A case where forming is performed by rotating the crankshaft 21 at a constant angular velocity to normally operating the main slide 24 while effectively using the servo die cushion (effectively transforming the die cushion force)

[Operation Condition (2)]

Figure 4A:
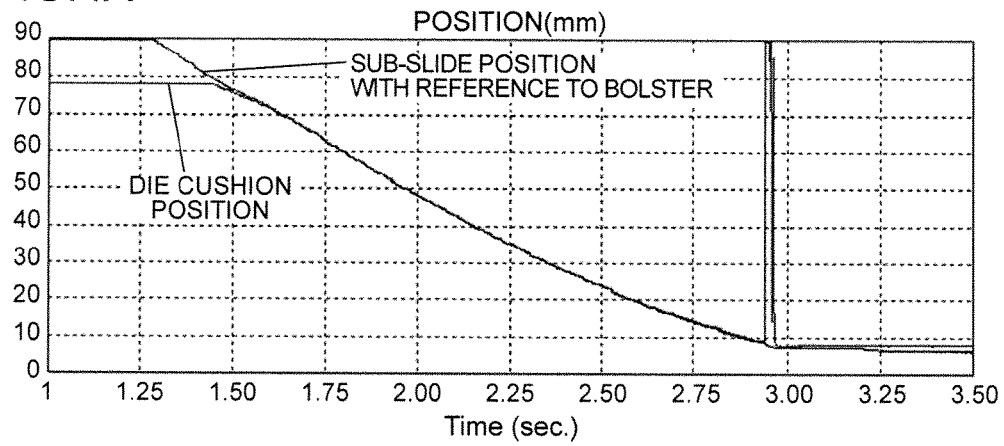
FIGS. 4A, 4B, and 4C are waveform charts showing a sub-slide position, a press load, and a sub-slide relative position in a drawing process in a case where the press machine was operated under an operation condition (1)
Figure 4B:
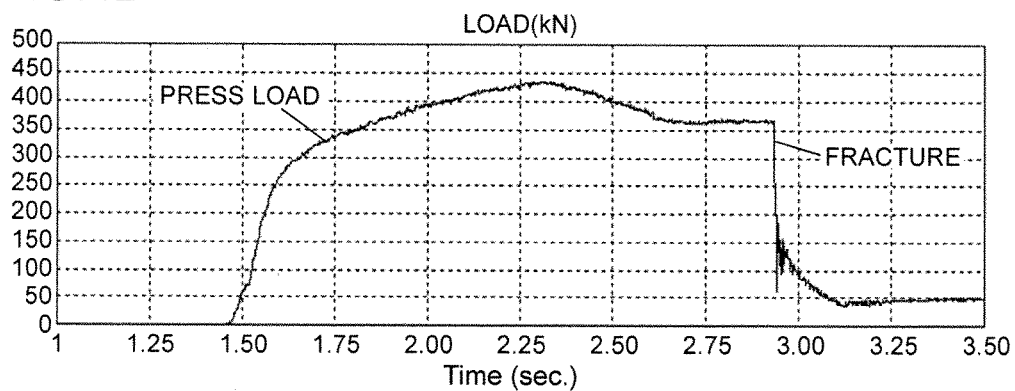
Figure 4C:
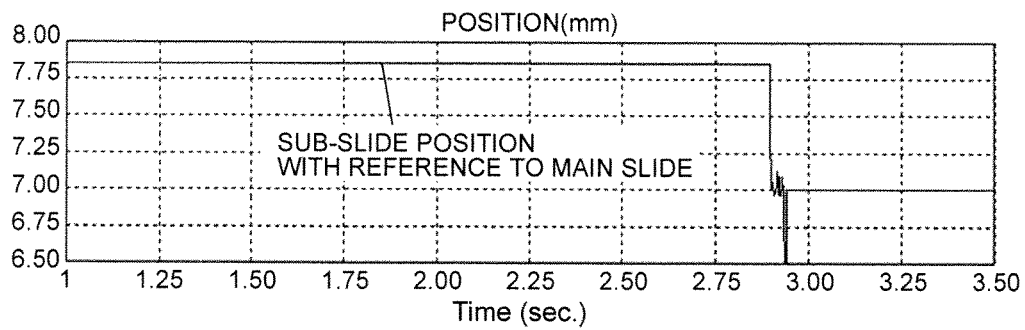
Figure 5A:
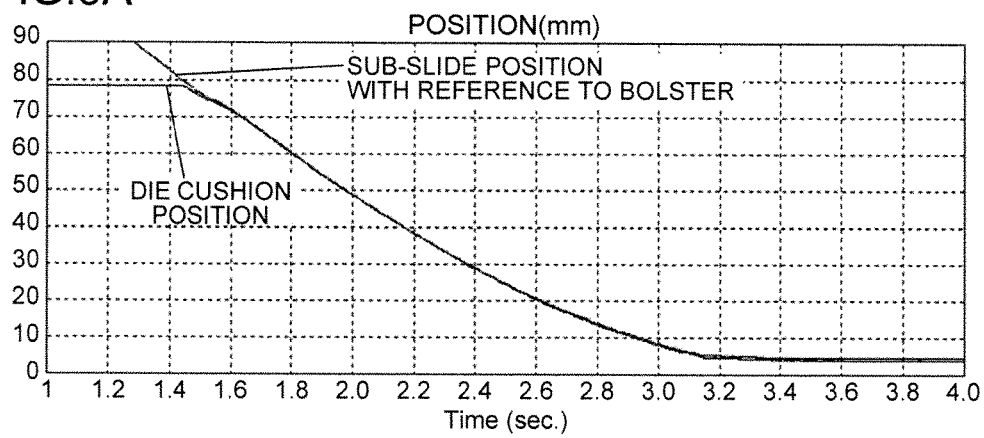
FIGS. 5A, 5B, and 5C are waveform charts showing a sub-slide position, a press load, and a sub-slide relative position in the drawing process in a case where the press machine was operated under an operation condition (2)
Figure 5B:
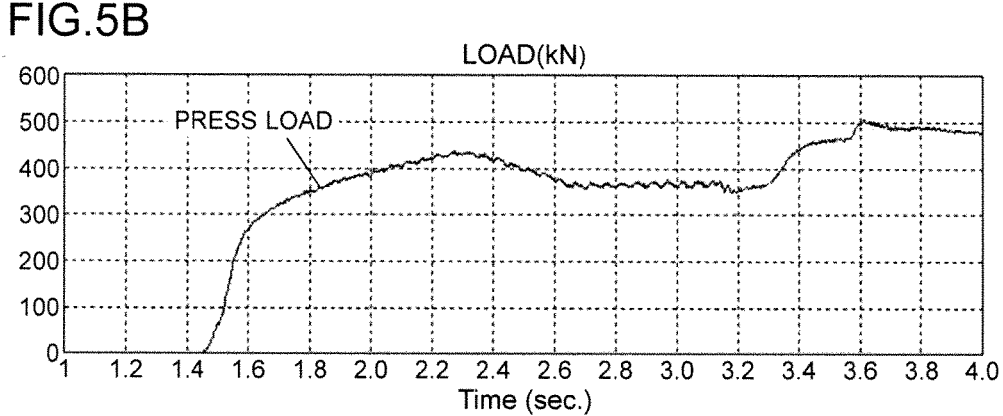
Figure 5C:
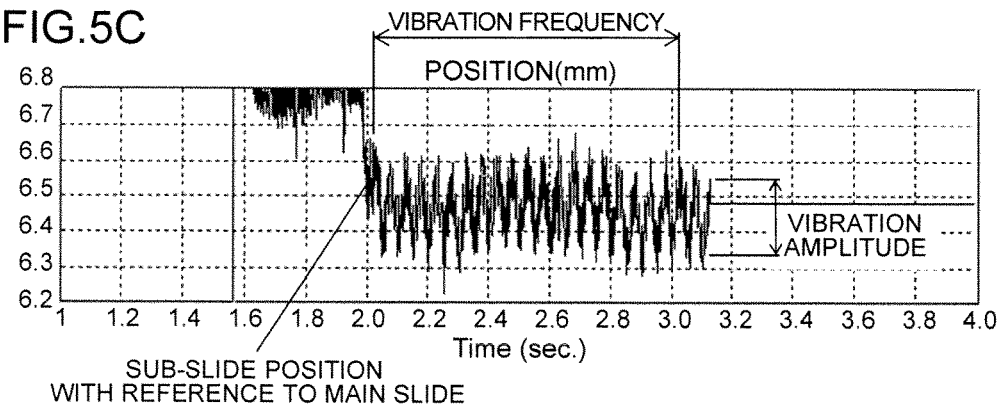
Figure 6A:
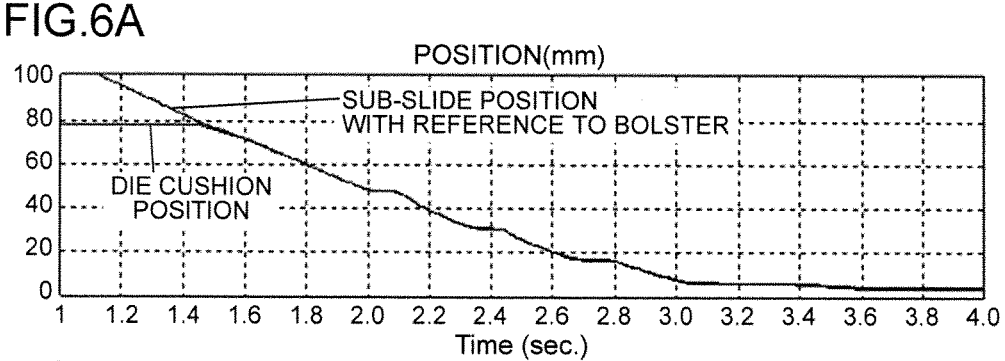
FIGS. 6A, 6B, 6C and 6D are waveform charts showing a sub-slide position, a sub-slide relative position, a sub-slide velocity, and a press load (sub-slide load) in the drawing process in a case where the press machine was operated under an operation condition (3)
Figure 6B:
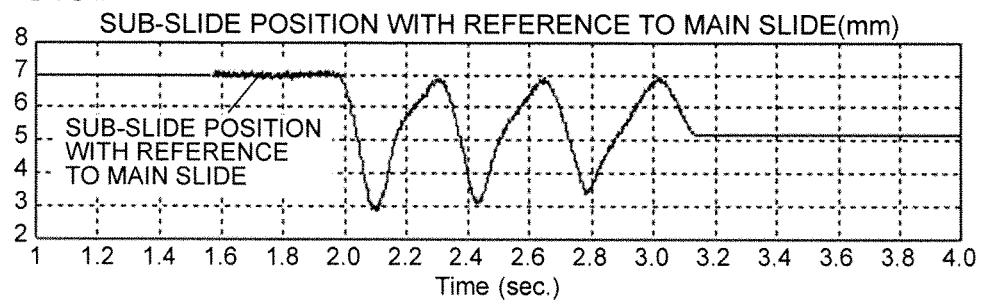
Figure 6C:
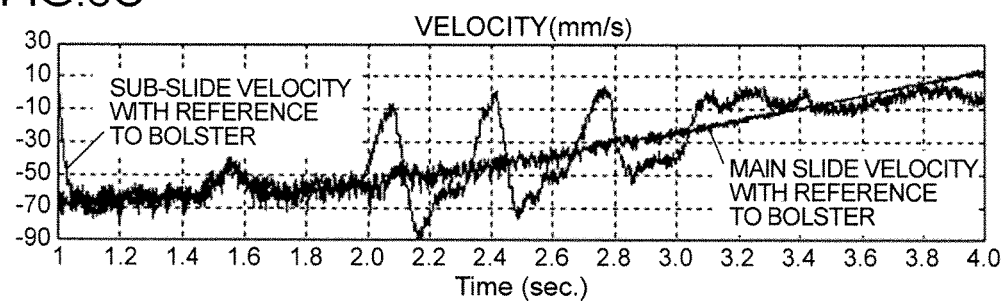
Figure 6D:
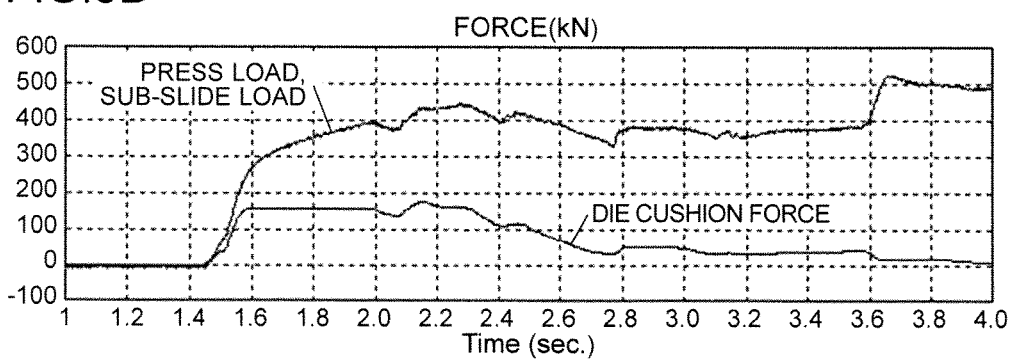
Figure 7A:
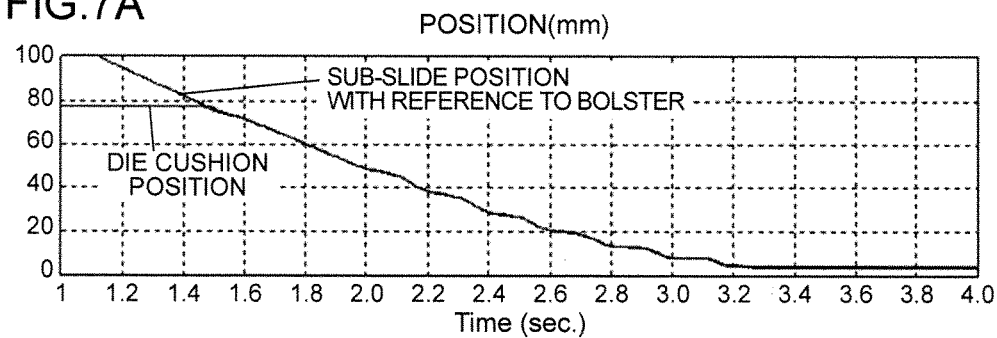
FIGS. 7A, 7B, 7C and 7D are waveform charts showing a sub-slide position, a sub-slide relative position, a sub-slide velocity, and a press load (sub-slide load) in the drawing process in a case where the press machine was operated under an operation condition (4)
Figure 7B:
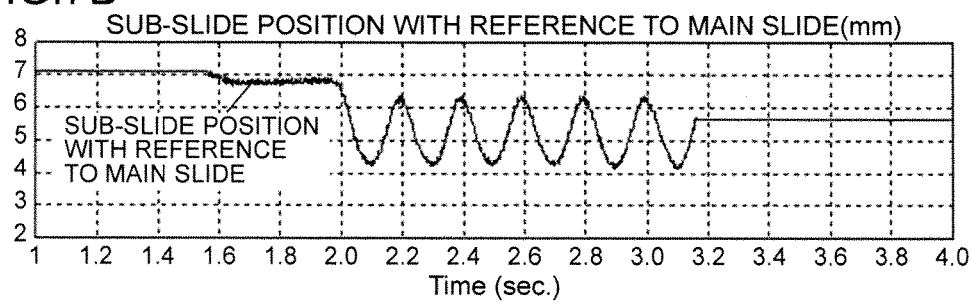
Figure 7C:
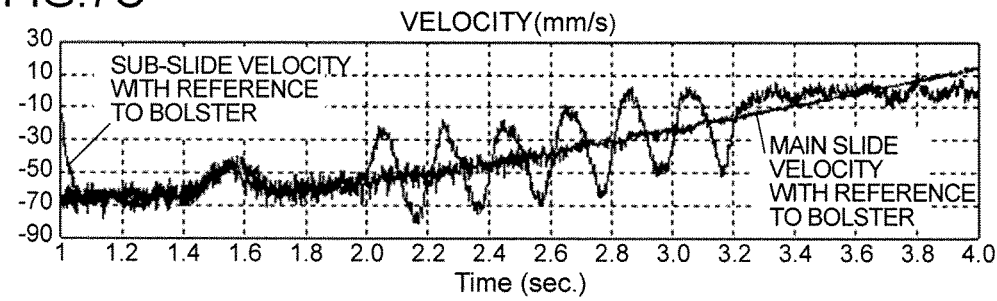
Figure 7D:
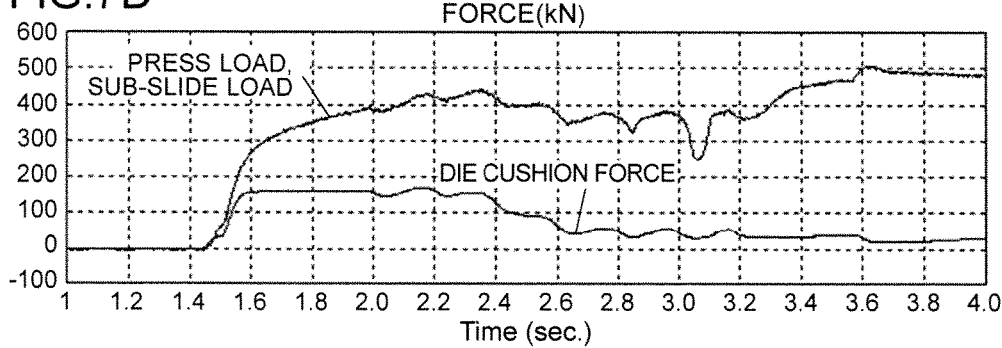

A case where, in addition to the operation condition (1), the sub-slide 26 is vibrated relative to the main slide 24 at a frequency of 20 Hz and a vibration amplitude (total amplitude) of 0.2 mm FIGS. 4A to 4C are waveform charts respectively showing a sub-slide position, a press load, and a sub-slide relative position in the drawing process in a case where the press machine 10 was operated under the operating condition (1). FIGS. 5A to 5C are waveform charts respectively showing a sub-slide position, a press load, and a sub-slide relative position in the drawing process in a case where the press machine 10 was operated under the operation condition (2).

As mentioned above, this example (experiment) is an experimental example under relatively difficult drawing conditions with the material SUS304, a thickness 1 mm, and a drawing ratio 50%.

In both of the operation conditions (1) and (2), forming was performed with the crank-type press machine at a constant number of strokes/minute (5 spm). Further, in both cases, a servo die cushion device was used, and a die cushion force is transformed (decreased) in accordance with the progress of the drawing (stroke) so as to improve the drawability.

However, as the basic drawing conditions are difficult, in the case of the operation condition (1), a crack occurred in the material toward the end of the drawing as shown in FIG. 4. In the waveform chart of FIG. 4B showing a press load, the portion where the load rapidly decreases indicates the moment when the material fractured. Although at the same time, a large change is also indicated in the waveform chart of FIG. 4A showing the sub-slide position and the waveform chart of FIG. 4C showing the sub-slide relative position, these changes were caused due to the fact that an abnormality was instantaneously caused in output signals of the detectors by a large acceleration resulting from the fracture of the material.

Then, the operation condition was changed from the operation condition (1) to the operation condition (2). Compared to the operation condition (1) where the sub-slide 26 is not vibrated, the operation condition (2) is different in that the sub-slide 26 is vibrated relative to the main slide 24 at a vibration frequency of 20 Hz and a vibration amplitude of 0.2 mm (amplitude 0.1 mm).

This operation condition (2) allowed the friction between the mold and the material to be reduced, and the sequence of the drawing was successfully performed without causing a crack in the material.

That is, in the case of the operation condition (2), among the factors that enabled the drawing, there is the effect of friction reduction between the mold and the material produced due to the vibration of the slide.

In the experiment, a disc-like material was deep-drawn into a shape having the flange part 30a, the cylinder part 30b, and the bottom part 30c as shown in FIG. 3B.

Once the drawing is started, a center part of the material, which becomes the bottom part at the end of the process, is pressed by the leading end of the punch (FIG. 3B). As the drawing proceeds, the flange part is pulled in a radial direction as well as compressed in a circumferential direction, and increases its plate thickness. The material is supplied to the cylinder part by a plastic flow of the material from the flange part which occurred as the material is pulled by the bottom part being pressed by the punch.

Then, a highest tensile stress occurs to the material and the plate thickness of the material becomes thinner at a boundary part between a radial part and a column part of the punch (an outer periphery of the punch leading end).

The friction between the material and the mold is a factor which hinders the plastic flow in drawing, and causes a material fracture at the boundary portion between the radial part and the column part of the punch.

In the operation condition (1), the fracture at the boundary portion was unavoidable even when an attempt was made to adjust the die cushion force (a hold-down force against the flange part) so as not to prevent the plastic flow of the material from the flange part to the cylinder part, while suppressing generation of wrinkles in the flange part, which is compressed in the circumferential direction and increases its plate thickness as the drawing proceeds.

However, by processing under the operation condition (2), the frictional force between the material and the mold was reduced and the plastic flow of the material was promoted, which enabled the successful drawing without a fracture.

Next, results of a drawing experiment conducted under each of operation conditions (3) to (5) shown below will be described.

[Operation Condition (3)]

A case where, in addition to the operation condition (1) described above, the sub-slide 26 is vibrated relative to the main slide 24 at a vibration frequency of 3 Hz and a vibration amplitude (total amplitude) of 4.1 mm

[Operation Condition (4)]

A case where, in addition to the operation condition (1), the sub-slide 26 is vibrated relative to the main slide 24 at a vibration frequency of 5 Hz and a vibration amplitude (total amplitude) of 2.0 mm

[Operation Condition (5)]

A case where, in addition to the operation condition (1), the sub-slide 26 is vibrated relative to the main slide 24 at a vibration frequency of 5 Hz and a vibration amplitude (total amplitude) of 2.5 mm Compared to the operation condition (2) described above, the operation conditions (3) to (5) are special in that the vibration frequency of the sub-slide 26 is low while the vibration amplitude thereof is large.

FIGS. 6A to 6D are waveform charts respectively showing a sub-slide position, a sub-slide relative position, a sub-slide velocity and a press load (a sub-slide load) in a drawing process, in a case where the press machine 10 was operated under the operation condition (3).

Compared to the operation condition (2), the operation condition (3) is a condition in which a large vibration amplitude is secured, and a raising speed, a lowering speed, and timing of speed change of the sub-slide 26 are controlled through special control so that the velocity of the sub-slide is not reversed (does not exceed 0).

Under the operation condition (3), vibration of the sub-slide 26 did not cause the velocity of the sub-slide 26 to become 0 or higher (not reversed) (see FIG. 6C), and as this allowed the stress partially acting on the material to be reduced, the sequence of the drawing was successfully performed without causing a crack in the material.

FIGS. 7A to 7D are waveform charts respectively showing a sub-slide position, a sub-slide relative position, a sub-slide velocity and a press load (a sub-slide load) in a drawing process, in a case where the press machine 10 was operated under the operation condition (4).

Compared to the operation condition (3), in the operation condition (4), the vibration frequency of the sub-slide 26 is larger and the vibration amplitude thereof is smaller.

Also in the case of the operation condition (4), the velocity of the sub-slide 26 did not become 0 or higher (see FIG. 7C), and as this allowed the stress partially acting on the material to be reduced, the sequence of the drawing was successfully performed without causing a crack in the material.

FIGS. 8A to 8D are waveform charts respectively showing a sub-slide position, a sub-slide relative position, a sub-slide velocity and a press load (a sub-slide load) in a drawing process, in a case where the press machine 10 was operated under the operation condition (5).

Compared to the operation condition (4), in the operation condition (5), the vibration amplitude of the sub-slide 26 is changed from 2.0 mm to 2.5 mm.

Figure 8A:
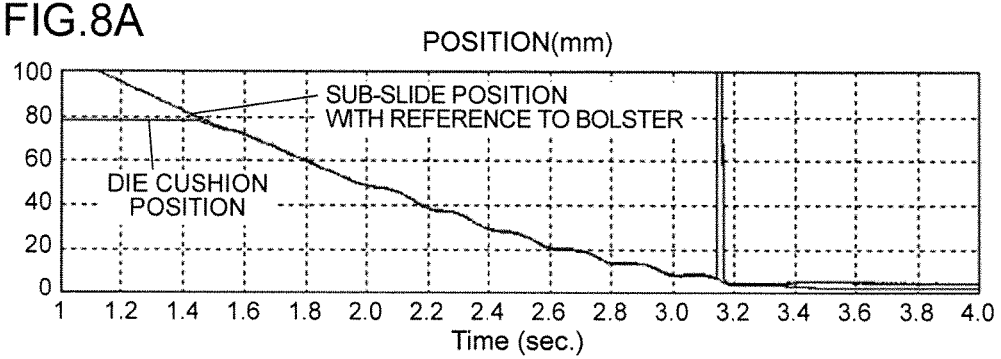
FIGS. 8A, 8B, 8C and 8D are waveform charts showing a sub-slide position, a sub-slide relative position, a sub-slide velocity, and a press load (sub-slide load) in the drawing process in a case where the press machine was operated under an operation condition (5)
Figure 8B:
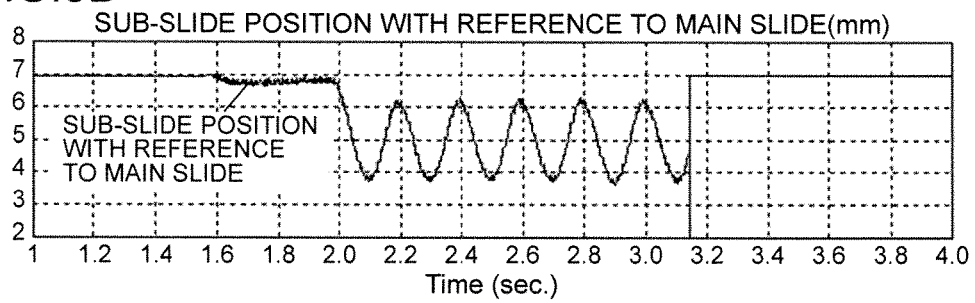

In the case of the operation condition (5), due to the larger vibration amplitude of the sub-slide 26 compared to the operation condition (4), the velocity of the sub-slide 26 was reversed (exceeded 0) toward the end of the drawing (see FIG. 8C), and the drawing failed (the material fractured during forming toward the end). In the waveform chart of FIG. 8D showing the press load, the portion where the load rapidly decreases indicates the moment when the material fractured. Although at the same time a large change is also indicated in the waveform chart of FIG. 8A showing the sub-slide position, the waveform chart of FIG. 8B showing the sub-slide relative position, and the waveform chart of FIG. 8C showing the sub-slide velocity, these changes were caused due to the fact that an abnormality was instantaneously caused in output signals of the detectors by a large acceleration resulting from the fracture of the material.

In the cases of the operation conditions (3) and (4), when the upper mold is lowered stepwise with respect to the lapse of time (FIG. 6A and FIG. 7A), the partial stress relief effect on the material occurring at the time when lowering of the upper mold is almost stopped or slowed down reduces the stress generated in the material at the boundary portion where fracture is likely to occur, and increases the limit drawing ratio.

Figure 8C:
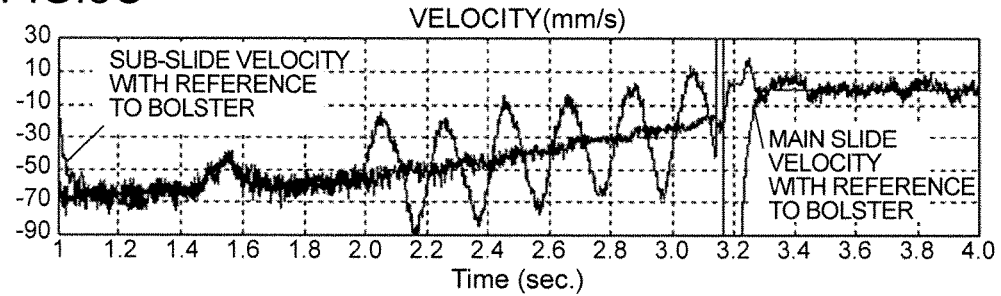
Figure 8D:
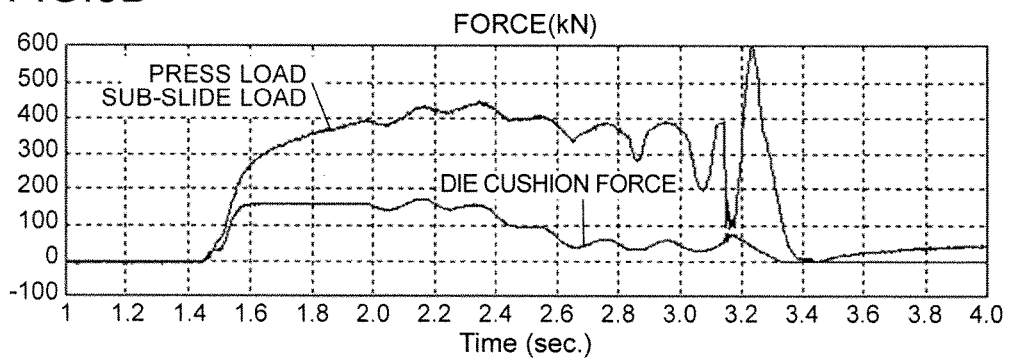

However, as with the operation condition (5), the drawing fails if the sub-slide 26 is raised (the velocity is reversed) in the middle of forming (FIG. 8C).

Now, consider a state where the punch is set on the lower mold, the die is set on the upper mold, and the flange part of the material is pressed against the die by the hold-down force of the die cushion.

When the raising speed due to the vibration of the sub-slide 26 relative to the main slide 24 exceeds the lowering speed of the main slide 24 in the middle of the process, the sub-slide 26 (upper mold) is raised relative to the lower mold despite the main slide 24 being lowered by the total speed.

Then, as the flange part is pressed against the die by the die cushion force (the hold-down force), the flange part is raised with the sub-slide 26. Namely, the material is moved in the direction of being pulled out of the punch mounted on the lower mold.

When the punch is moved in the direction of being pulled out of the material, the frictional force acting between a punch side surface and an inner surface of the cylinder part of the material acts, relative to the cylindrical surface of the material, in the direction opposite to the direction of the plastic flow of the material of the cylinder part which accompanies the drawing.

When such reversal of the direction of the frictional force acting between the punch side surface and the inner surface of the cylinder part of the material occurs, the flow of the material to the boundary portion is hindered and a fracture occurs in the middle of the process.

While the above results of the experiment under the above operation conditions (1) to (5) represent only a part of the experimental results, many vibration experiments were conducted with varying operation conditions (the vibration conditions (vibration frequency and vibration amplitude) of the sub-slide 26).

Figure 9:
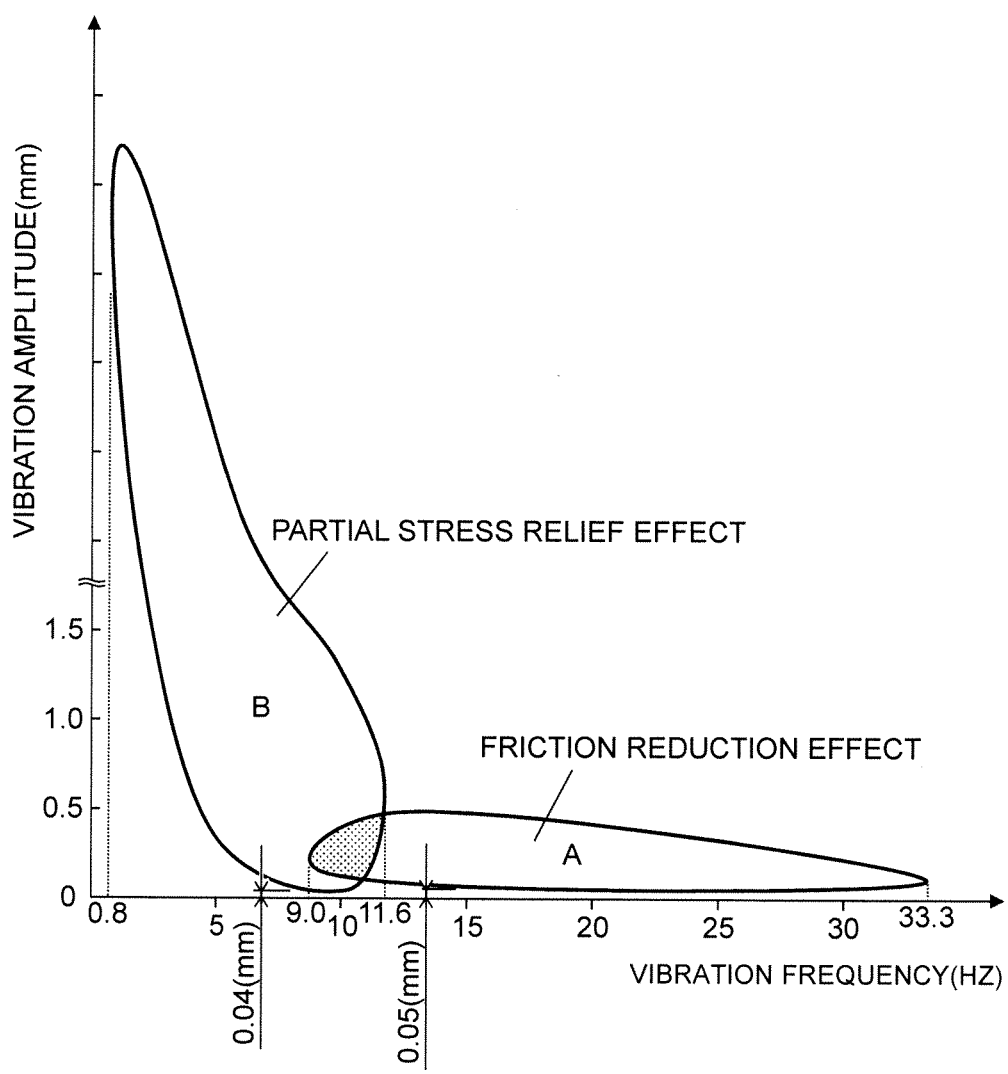
FIG. 9 is a graph based on the results of the drawing experiment, showing a correlation between a vibration frequency and a vibration amplitude of the sub-slide, in a case where the drawing was completed without the material being fractured.

FIG. 9 is a graph based on the results of the drawing experiment, showing a correlation between the vibration frequency and the vibration amplitude of the sub-slide in a case where the drawing was completed without the material being fractured.

As shown in FIG. 9, a region A where the drawing was successful is a region where the vibration frequency of the sub-slide is 9 Hz or higher but 33.3 Hz or lower and the vibration amplitude of the sub-slide is 0.05 mm or larger but 0.5 mm or smaller, while another region B where the drawing was successful is a region where the vibration frequency of the sub-slide is 0.8 Hz or higher but lower than 11.6 Hz and the vibration amplitude of the sub-slide is 0.04 mm or larger but smaller than a value at which the direction of the velocity of the sub-slide during forming is reversed.

It is considered that, in the region A with relatively high frequencies, the drawing was successful due to the effect of friction reduction between the mold and the material, and that, in the region B with relatively low frequencies, the drawing was successful due to the partial stress relief effect which relieves the stress partially acting on the material.

Thus, favorable press-forming can be performed even under relatively difficult press-forming conditions, by vibrating the sub-slide such that the vibration conditions within the regions A or B shown in FIG. 9 are satisfied.

[Another Embodiment of Relative Position Command Unit 51]

Figure 10:
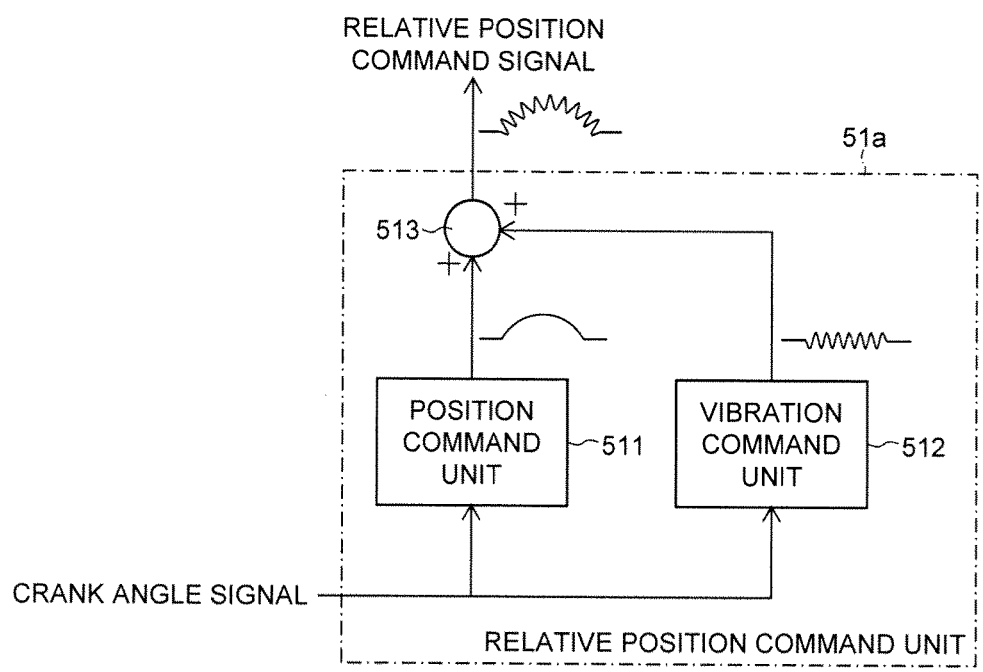
FIG. 10 is a block diagram showing an embodiment of a relative position command unit.

FIG. 10 is a block diagram showing another embodiment of the relative position command unit 51 shown in FIG. 2.

A relative position command unit 51a shown in FIG. 10 is constituted of a position command unit 511, a vibration command unit 512, and an adder 513.

The position command unit 511 outputs a position command signal indicating the position of the sub-slide 26 with reference to the main slide 24 for a predetermined period which is set according to a crank angle, and practically outputs a position command signal for controlling a slide motion of the main slide 24.

The press machine which drives a slide with a crankshaft or a link mechanism has a low variable speed response of the slide, and especially the press machine including a flywheel cannot control the variable velocity of the slide. However, it is possible to control the slide motion of the sub-slide 26, on which the upper mold is mounted, by outputting the above position command signal from the position command unit 511 and, on the basis of this position command signal, controlling the relative position of the sub-slide 26. This allows slide motions in which, for example, the lowering speed of the sub-slide 26 during forming is constant, or the sub-slide 26 is stopped for a certain time at the bottom dead point.

As with the relative position command unit 51 shown in FIG. 2, the vibration command unit 512 outputs a vibration command signal indicating the vibration frequency and the vibration amplitude of the sub-slide 26 for a predetermined period which is set according to the crank angle.

The adder 513 adds up the position command signal added from the position command unit 511 and the vibration command signal added from the vibration command unit 512, and outputs the signal obtained by the addition as the final relative position command signal for the sub-slide 26.

[Embodiment of Relative Position Command Signal]

The vibration conditions (frequency and vibration amplitude) of the sub-slide 26 are fixed during the vibration period in the operation conditions (1) to (4) described above. However, the present invention is not limited thereto and, for example, at least one of the frequency and the vibration amplitude may be variable according to the position of the main slide 24.

Figure 11A:
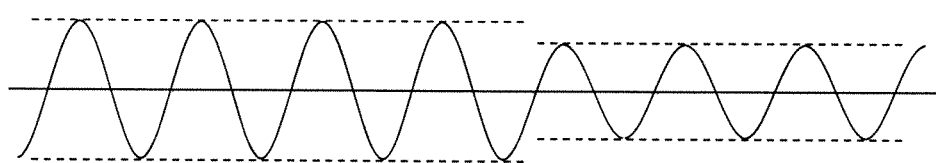
FIGS. 11A and 11B are waveform charts showing an embodiment of a relative position command signal.
Figure 11B:
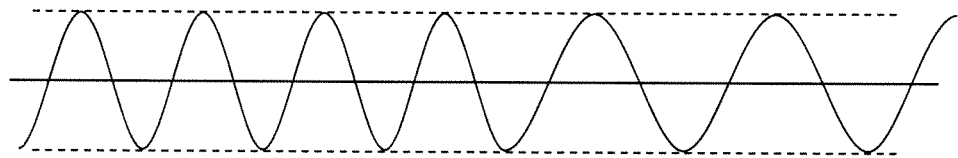

More specifically, with respect to the relative position command signal of the sub-slide 26 output from the relative position command unit 51 (FIG. 2) according to the crank angle signal (position of the main slide 24), the vibration amplitude of the sub-slide 26 may be changed stepwise (or continuously) as shown in FIG. 11A, or the vibration frequency of the sub-slide 26 may be changed stepwise (or continuously) as shown in FIG. 11B.

Since the velocity of the main slide 24 becomes lower as it approaches the bottom dead point (FIG. 6C) due to the crankshaft 21 rotating at a constant angular velocity, in a case where the vibration conditions of the sub-slide 26 are fixed, the direction of the velocity of the sub-slide 26 (mold) is more likely to be reversed in the vicinity of the bottom dead point. However, by making variable the vibration amplitude or the vibration frequency of the sub-slide 26 as described above, the sub-slide 26 can be vibrated further to the vicinity of the bottom dead point without causing the direction of the velocity of the sub-slide 26 to be reversed.

[Others]

The present invention can be not only applied to a crank press, but also to press machines such as a mechanical press and a hydraulic press. While the case where the oil is used as the hydraulic fluid of the cylinder-piston mechanism constituted of the main slide and the sub-slide has been described, the present invention is not limited thereto, and water or other fluids may be used. Further, the present invention can also be applied to a press machine, etc. which drives one main slide by multiple connecting rods.

It is obvious that the present invention is not limited to the embodiments described above, but various modifications can be made within the scope of the present invention.

What is claimed is:

1. A press machine comprising:
a main slide reciprocable in a rectilinear advancing direction;
a main slide drive device configured to drive the main slide to reciprocate in the rectilinear advancing direction;
a sub-slide on which a mold is mounted, the sub-slide reciprocable in the same direction as the main slid, and a compression force applied to the main slide being transmitted to the sub-slide through hydraulic pressure, wherein the main slide and the sub-slide constitute a cylinder-piston mechanism, and the main slide is one of a cylinder and a piston of the cylinder-piston mechanism, while the sub-slide is the other of the cylinder and the piston of the cylinder-piston mechanism;
a sub-slide drive device configured to drive the sub-slide to reciprocate relative to the main slide, the sub-slide drive device driving the sub-slide to reciprocate in the same direction as the main slide in response to a change in the hydraulic pressure; and
a vibration control device configured to control, through the sub-slide drive device, the sub-slide to vibrate at least two times during one press operation cycle, by periodically changing the hydraulic pressure, wherein a material is formed through cooperation between the main slide drive device and the sub-slide drive device during the one press operation cycle.

2. The press machine according to claim 1, wherein the vibration control device is configured to control the sub-slide, through the sub-slide drive device, to vibrate at a vibration frequency from 9 Hz to 33.3 Hz and a vibration amplitude from 0.05 mm to 0.5 mm.

3. The press machine according to claim 1, wherein the vibration control device is configured to control the sub-slide, through the sub-slide drive device, to vibrate at a vibration frequency of 11.6 Hz or higher but 33.3 Hz or lower and a vibration amplitude of 0.05 mm or larger but 0.5 mm or smaller, or
the vibration control device is configured to control the sub-slide, through the sub-slide drive device, to vibrate at a vibration frequency of 0.8 Hz or higher but lower than 11.6 Hz and a vibration amplitude of 0.04 mm or larger, wherein the sub-slide continues moving toward the material while the main slide is descending towards the material.

4. The press machine according to claim 1, wherein the vibration control device is configured to control the sub-slide, through the sub-slide drive device, the sub-slide to continue moving toward the material while the main slide is descending towards the material.

5. The press machine according to claim 4, wherein the vibration control device is configured to control the sub-slide, through the sub-slide drive device, the sub-slide to vibrate at a vibration frequency from 0.8 Hz to 11.6 Hz and a vibration amplitude of 0.04 mm or larger, wherein the sub-slide continues moving toward the material while the main slide is descending towards the material.

6. The press machine according to claim 1, wherein the vibration control device comprises:
a relative position command device which outputs a relative position command signal indicating a position of the sub-slide relative to the main slide; and
a relative position detection device which detects a position of the sub-slide relative to the main slide and outputs a relative position detection signal indicating the detected relative position, wherein
the vibration control device controls the sub-slide drive device on the basis of the relative position command signal output from the relative position command device and the relative position detection signal output from the relative position detection device.

7. The press machine according to claim 6, further comprising:
a position command unit which outputs a position command signal indicating a position of the sub-slide with reference to the main slide; and
a vibration command unit which outputs a vibration command signal indicating a vibration frequency and a vibration amplitude of the sub-slide, wherein
the relative position command device adds the vibration command signal output from the vibration command unit to the position command signal output from the position command unit and outputs the relative position command signal.

8. The press machine according to claim 1, wherein the sub-slide drive device includes a servomotor and a hydraulic pump/motor which is driven by the servomotor, and supplies a pressurized fluid to a hydraulic chamber of the cylinder-piston mechanism.

9. The press machine according to claim 1, wherein the main slide drive device continuously moves the main slide through a connecting rod of the press machine at least for a forming period.

10. The press machine according to claim 1, wherein the vibration control device is configured to change, through the sub-slide drive device, at least one of a vibration frequency and a vibration amplitude of the sub-slide during forming of the material.

11. A method for controlling a slide of a press machine including a main slide reciprocable in a rectilinear advancing direction, and a sub-slide, on which a mold is mounted, reciprocable in the same direction as the main slide, wherein the main slide and the sub-slide constitute a cylinder-piston mechanism, and the main slide is one of a cylinder and a piston of the cylinder-piston mechanism, while the sub-slide is the other of the cylinder and the piston of the cylinder-piston mechanism, the method comprising steps of:

driving the main slide in the rectilinear advancing direction and driving the sub-slide in the rectilinear advancing direction interlockingly with the driving of the main slide, so as to transmit a compression force to the sub-slide through a hydraulic pressure applied interlockingly with the driving of the main slide at least during forming of a material during one press operation cycle; and vibrating the sub-slide at least two times during the one press operation cycle by periodically changing the hydraulic pressure at least during forming of the material.

12. The method for controlling a slide of a press machine according to claim 11, further comprising controlling a vibration amplitude and a vibration frequency at which the sub-slide vibrates to reduce friction on sliding surfaces of the material and the mold.

13. The method for controlling a slide of a press machine according to claim 12, further comprising setting the vibration frequency of the sub-slide from 9 Hz to 33.3 Hz and the vibration amplitude of the sub-slide from 0.05 mm to 0.5 mm.

14. The method for controlling a slide of a press machine according to claim 12, further comprising:

setting the vibration frequency of the sub-slide from 11.6 Hz to 33.3 Hz and the vibration amplitude of the sub-slide from 0.05 mm to 0.5 mm, or setting the vibration frequency of the sub-slide of 0.8 Hz or higher but lower than 11.6 Hz and the vibration amplitude of the sub-slide of 0.04 mm or larger, wherein the sub-slide continues moving toward the material while the main slide is descending towards the material.

15. The method for controlling a slide of a press machine according to claim 11, further comprising controlling the sub-slide to continue moving toward the material while the main slide is descending towards the material.

16. The method for controlling a slide of a press machine according to claim 15, further comprising setting a vibration frequency of the sub-slide of 0.8 Hz or higher but 11.6 Hz or lower and a vibration amplitude of the sub-slide of 0.04 mm or larger, wherein the sub-slide continues moving toward the material while the main slide is descending towards the material.

17. The method for controlling a slide of a press machine according to claim 11, further comprising changing at least one of a vibration frequency and a vibration amplitude during forming of the material.

* * * * *